3,748,171
PROCESS FOR GENERATING VESICULAR MATERIAL HAVING POROUS, SORPTIVE SURFACE STRUCTURE WITH METALLURGICAL SILICON ADDITION
John E. Peeling, Jr., Reisterstown, Md., assignor to SCM Corporation, Cleveland, Ohio
No Drawing. Filed May 21, 1971, Ser. No. 145,911
Int. Cl. C03c 5/00, 5/02; C23d 5/00
U.S. Cl. 117—129                                   7 Claims

ABSTRACT OF THE DISCLOSURE

In the formation of vesicular, matte or semi-matte ceramic material useful for imparting continuous cleaning properties to a food cooking oven wherein an admixture comprising frit-containing enameling composition and particulate elemental aluminum is fired, replacing at least a portion of said aluminum with a particulate metallurgical silicon improves color stability of said ceramic material.

---

This application relates to ceramic technology closely allied to these copending and coassigned U.S. patent application, Ser. Nos. 817,128 (coatings) filed Apr. 17, 1969; now U.S. Pat. No. 3,580,733 of May 25, 1971; 67,996 (discrete particles, agglomerates, and coatings) filed Aug. 28, 1970; and 132,555 (coatings, discrete particles, and agglomerates) filed Apr. 8, 1971. It also relates to apparatus made in a manner similar to any of the applications, said apparatus having continuous cleaning properties, particularly food cooking apparatus such as ovens having interior surfaces so coated with such ceramic material. Such ceramic surfaces have been characterized as vesicular with porous, sorptive structure usually of matte (or mat) finish and may be referred to herein simply as "vesicular" for convenient identification purposes.

Heretofore it has been proposed to make cooking ovens with roughened interior surfaces containing art-recognized oxidation catalyst materials deposited upon, imbedded into, and smelted into a ceramic coating to enhance the continuous cleaning properties thereof. Such surfaces can vary from quite resistant to abrasive action to relatively poorly resistant to abrasive action.

Typically the oxidation catalyst suggested for such incorporation includes the elemental metals, e.g., ruthenium, palladium, platinum, the oxides, cerates, manganates, manganites, chromates, chromites or vanadates of cobalt, nickel, cerium, ruthenium, palladium or platinum, various iron, copper, nickel or cobalt-providing compounds, and smelted-in oxidation-inducing oxides such as those of cobalt, manganese, copper and chromium. The resulting matte to semi-matte surfaces usually are dark, and are effective for "continuous cleaning" by which is meant that, when heated to 250–550° F. Over an extended period as in normal on-going food cooking operations, there is apparent to the naked eye a diminishing and/or retarding of stains resulting from accumulations of carbonaceous residues thereon which in turn resulted from spattering of grease from the cooking of food. U.S. patents representative of this art include: 3,266,477; 3,460,523; 3,513,109; 3,536,056; 3,547,098; 3,549,419; 3,556,077; and 3,576,667. Pertinent to this art also is the Japanese "Kamado pot," made of sorptive, iron-containing "Mikawa" pottery, heretofore described in connection with Ser. No. 817,128, such pot being used with charcoal heating therein for traditional cooking of foods, e.g., broiling of meats, in the manner of a covered, vented smoke cooker.

A particular advantage I find in the use of the present improvement is the generation of a quite uniform, dark, charcoal gray color that is fairly stable in reflectance as measured by the Gardner color difference meter. Additionally, when the admixture is fired, e.g., over a range of about 1400–1550° F., color difference between various firings is suppressed. Dark color is desirable in continuous cleaning surfaces. Furthermore, when a metallurgical silicon, and particularly one with a fairly high iron content, is smelted into a frit composition, it appears to aid the fluxing or fluidity of such composition. To the extent that powdered aluminum and powdered magnesium are replaced in the admixture by silicon, this reduces the pyrotechnics which ensue during the firing operation to form the ceramic.

The instant invention is an improvement in process for forming vesicular material of porous, sorptive surface structure having the property of continuous cleaning, said structure resulting from the firing of an admixture comprising frit-containing enameling composition and particulate elemental aluminum. The improvement comprises replacing at least a portion of said aluminum in said admixture with a particulate metallurgical silicon.

By a metallurgical silicon (in the iron and steel industry these materials are often referred to as "silicides"), I mean silicon-rich alloys, including so-called "silicon metal," used in the metallurgical arts. Generally such alloys have at least about 38% silicon on up to about 99% silicon, although some are somewhat lower in silicon content.

Typically such alloys are standard 50% ferrosilicon (47–51% Si, remainder mainly Fe); standard 65% ferrosilicon (65–70% Si, remainder mainly Fe); standard 75% ferrosilicon (73–78% Si, remainder mainly Fe); standard 85% ferrosilicon (83–88% Si, remainder mainly Fe); "silicon metal" (97.75% Si min., 0.07% Ca max., 0.51–1.00 Fe max.); calcium-silicon (30–33% Ca, 60–65% Si, 1.5–3% Fe); calcium-manganese-silicon (16–20% Ca, 14–18% Mn, 44–59% Si); ferrochrome silicon (38–42% Cr, 38–42% Si, 0.05% C max.); magnesium ferrosilicon (40–48% Si, 8–10% magnesium, 1–1.5% Ca, 0.5% Ce); silicomanganese (65–68% Mn, 12.5–18.5% Si, 1.5–3.0% C, balance mainly Fe); SMZ alloy (60–65 Si, 5–7% Zr. 5–7% Mn, 3–4% Ca, balance mainly Fe); and generally those grades of metallurgical silicon (and silicides) used as deoxidizers in the refining of metals. For efficiency and economy, I prefer to use "silicon metal" or standard 50–85% ferrosilicon, although I can use quite efficiently also nickel-silicon containing about 50–85% silicon.

I can use the instant admixtures for producing continuous cleaning ceramic coatings, discrete particles and agglomerates analogous to the fired-out ceramic materials shown in the three first-mentioned U.S. patent applications using broadly the teachings of those applications with respect to frits, enameling composition, metal coating technique, discrete particle and agglomerate formation, slip preparation, particle sizes, firing ranges and times, and test procedures. Advantageously, the proportion of aluminum flake or powder plus the particulate metallurgical silicon is in the proportion upwards to 150 parts per 100 parts of frit used in the enameling composition, generally about 10–150 parts per 100 parts of frit with at least 0.5 part being said silicon.

In the instance where the silicon is put into the admixture with the frit by simple mixing as a "mill addition" or "mill additive," I find that as much as all of the aluminum can be left out, and the admixture will contain then upwards to about 150 parts of said silicon per 100 parts of frit. In forming such admixture, I find it advantageous to use at least 10–20 parts of said silicon.

In the instance where said metallurgical silicon is smelted into the frit batch, for simplicity of calculation, I calculate the weight of the frit to include the weight of all the frit ingredients, including this silicon, as the base 100 parts, and this silicon to be a fraction of said 100 parts. In such smelting operation, I find it advantageous to incorporate said silicon in the proportion of about 0.5–30 parts per 100 parts of the frit on this basis. Such silicon addition, and particularly such addition using a high iron content in the silicon (20–50%), calls generally for lower smelting temperatures than without it and makes the resulting frit composition fairly fluid.

In the preferred embodiment particulate aluminum is used in excess of the silicon regardless of how the silicon is incorporated into the admixture. This gives superior adhesion to metal substrates when fired out as distinguished from those cases where most or all of the particulate aluminum is replaced by said metallurgical silicon. In general, then, the preferred admixtures contain from 20–120 parts of particulate aluminum per 100 parts of frit and 0.5–60 parts of said silicon per 100 parts of frit, with the particulate elemental aluminum present being in excess of said metallurgical silicon additive.

The frits or admixtures for firing can have, if desired, various additional Period IV metals either smelted into the frit or added as a mill additive in the manner described in Ser. No. 132,555. While the presence of aluminum metal in the admixture is desirable to obtain the best bonds to metal from firing the instant admixtures, where aluminum is used in a much reduced percentage or is absent, bonds to steel substrates can be improved by using "soft" frits, that is those which generally are fired at temperatures of 1300–1420° F. or even lower.

I have found that the firing of the advantageous and preferred admixtures of this improvement can best be done in the range of about 1400–1550° F. for about 2–5 minutes. In general the admixture is brought up in temperature rapidly (within about 1–2 minutes) in the preferred firing operation ("hot point firing") to obtain best cleanability and adhesion to metal, although slower heating up can be tolerated. Halides such as fluorides in the admixture can be used, but preferably are omitted in this improvement for lowering of reflectance of the fired-out ceramic. The preferred aluminum is in the form of atomized powder, but a paste of the finely-divided flaked metal also can be used.

The following examples show ways in which this improvement has been practiced, but should not be construed as limiting it. In this specification all temperatures are in degrees Fahrenheit, all percentages are by weight, and all parts are parts by weight unless otherwise specified. Reflectances were measured by the Gardner Color Difference meter.

EXAMPLE 1

A frit was prepared by conventionally smelting the materials set forth in Table I at a temperature of 2150°, then conventionally quenching.

TABLE I

| | Parts |
|---|---|
| Silica | 520 |
| Soda ash | 328 |
| Fluorspar | 60 |
| Zinc oxide | 26 |
| Sodium silicofluoride | 105 |
| Lithium carbonate | 90 |
| Zirconium silicate | 105 |
| Barium carbonate | 15 |
| Rasorite | 195 |
| Rutile | 53 |
| Cobalt oxide | 17 |
| | 1773 |

The calculated oxide composition for the frit is given in Table II.

TABLE II

Oxide composition

| | Wt. percent comp. |
|---|---|
| $Na_2O$ | 18.87 |
| CaO | 2.75 |
| Fluorine | 3.77 |
| $B_2O_3$ | 8.02 |
| $SiO_2$ | 42.56 |
| $Al_2O_3$ | 0.40 |
| MgO | 0.08 |
| ZnO | 1.64 |
| $Li_2O$ | 2.29 |
| $ZrO_2$ | 15.49 |
| BaO | 0.74 |
| CoO | 1.02 |
| $TiO_2$ | 3.27 |
| $V_2O_5$ | 0.03 |

After smelting the total weight of the batch was 1556 parts.

The frit prepared after smelting was premilled in a ball mill so that substantially all of the frit would pass a 325 mesh screen (Tyler Standard). The frit had an incipient deformation point of about 850°–900°.

EXAMPLE 2

One thousand parts of the frit prepared in Example 1 was mixed with 70 parts of a conventional porcelain enameling clay, 50 parts finely-divided silica having a particle size of about 325 mesh (Tyler Standard), 3.75 parts hydrated borax, 1.25 parts of a bentonite clay, 1.25 parts magnesium carbonate, 0.6 part of sodium nitrite and 483 parts of water. These materials were charged to a ball mill and ground for 1½ hours to form a slip.

One hundred four parts of this slip, having about 80 parts of non-volatile material therein and 71 parts of the frit of Example 1, were blended with 20 parts of finely-divided silicon metal (97.75% Si min., 0.07% Ca max., 0.5–1.00% Fe max.) and milled in a vented ball mill to produce a coating slip. The resulting coating slip was sprayed onto a 20 guage steel substrate (conventionally prepared for porcelain enameling) in the proportion of about 15 grams of dry solids per sq. ft. (about 35 grams wet) of substrate. The coated substrate was dried at about 300° F. for about 10 minutes until most of the surface water had been removed from the coating. The coated substrate then was fired in the presence of air in a muffle furnace at a temperature of about 1480° F. for four minutes, removed and cooled in a cooling zone to room temperature. The heat up of the coated substrate from room temperature to firing temperature took about one minute. The soaking time at the firing temperature, 1480°, was about three minutes, and after this time the coated substrate was removed from the muffle furnace to air for cooling.

Bacon grease (about 15 milligrams per sq. centimeter of coated panel surface) was brushed on the coated surface of a panel preheated to 375° F. in the form of a plurality of stripes. The panel was heated for one hour at 375° F., then raised to 525° F. for two hours to make one test panel. Residual apparent staining was judged by the naked eye and the coating was appraised as demonstrating fair continuous cleaning properties.

EXAMPLE 3

Three frits, A, B, and C, were prepared, frits A and B by conventionally smelting the indicated batches at 2100° and frit C by conventionally smelting its indicated batch at 2450°, then quenching the batches conventionally. Table III gives the batch formulations of, and Table IV the approximate oxide analysis of the resulting frits.

TABLE III

| | Frit | | |
|---|---|---|---|
| | A | B | C |
| Soda Ash | 328 | 131 | |
| Fluorspar | 60 | 153 | |
| Flint | 520 | 293 | 419 |
| Rasorite | 195 | | |
| Zinc Oxide | 26 | 51 | |
| Sodium silicofluoride | 105 | | |
| Lithium carbonate | 90 | | 39 |
| Zircon | 364 | 166 | 31 |
| Barium carbonate | 15 | 393 | |
| Rutile | 53 | | 273 |
| Co₃O₄ | 17 | | 68 |
| Anhydrous borax | | 421 | 83 |
| Sodium nitrate | | 36 | |
| Antimony trioxide | | 35 | |
| Sodium tripolyphosphate | | 37 | |
| Nephelene syenite | | 284 | |
| Feldspar | | | 167 |
| Potassium carbonate | | | 100 |
| Red iron oxide | | | 552 |
| Cupric oxide | | | 49 |
| Manganese dioxide | | | 19 |

TABLE IV

| | Frit | | |
|---|---|---|---|
| | A | B | C |
| Na₂O | 17.9 | 14.1 | 1.8 |
| CaO | 2.7 | 5.9 | 0.1 |
| F | 3.8 | 3.9 | |
| B₂O₃ | 8.0 | 15.6 | 3.3 |
| SiO₂ | 42.6 | 27.8 | 31.3 |
| Al₂O₃ | 0.4 | 3.7 | 1.7 |
| ZnO | 1.6 | 2.7 | |
| Li₂O | 2.3 | | 0.9 |
| ZrO₂ | 15.5 | 6.0 | 1.2 |
| BaO | 0.7 | 16.3 | |
| CoO | 1.0 | | 3.8 |
| TiO₂ | 3.3 | | 15.6 |
| K₂O | | 0.7 | 4.9 |
| P₂O₅ | | 1.2 | |
| Sb₂O₃ | | 1.9 | |
| SrO | | 0.2 | |
| Fe₂O₃ | | | 31.6 |
| CuO | | | 3.1 |
| MnO₂ | | | 0.8 | trademark "Triton X–100" by the Rohm & Haas Company.

The binder solution was mixed with 510 parts of the milled enameling composition, and the aluminum metal, particulate metallurgical silicon, and other metals and oxides were blunged in. The aluminum was in the form of a paste containing 69% elemental aluminum as fine flakes. The metallurgical silicon powder was so-called "silicon metal." The other metals and oxides were added in fine particle form, the dosage used being calculated as parts of the metal or metal oxide per 100 parts of frit used in the resulting admixture as tabulated below in Table V.

The various admixtures were sprayed onto light guage steel substrates that had been conventionally prepared for porcelain enameling to yield about 25 grams of dry solids per square foot. The coated substrate was dried at about 300° for about 10 minutes, then fired in a furnace similarly to the panel of Example 2 with the firing time at top temperature as indicated in Table V.

The continuous cleaning properties were measured as follows: the sample panels coated with the resulting hard, finely-porous, sorptive, matte coating were soiled by first heating them to 350° in a conventional household oven, then applying to their hot ceramic surfaces droplets of vegetable oil with an array of oil-fed various-sized rods, the application being about a gram of oil over a 4" x 6" area, then finally heating for one hour at 350°, followed by two hours at 525°. Upon cooling, the panels were examined visually for observable stain and presence or absence of heavy, varnish-like deposits, which were absent in all cases.

TABLE V

| Example | Aluminum metal | "Silicon metal" | Nickel metal | Cr₂O₃ | Firing time/temp. | Bond to substrate | Reflectance | Cleanability observed |
|---|---|---|---|---|---|---|---|---|
| 4 | 31.8 | 7.9 | 7.9 | | 3'/1,520° | Good | 6.7 | Very good. |
| 5 | 47.7 | 15.7 | 15.7 | | 3'/1,440° | do | 7.2 | Fair to good. |
| 6 | 47.7 | 15.7 | | 10 | 3'/1,520° | do | 8.5 | Fair. |
| 7 | 31.8 | 31.8 | | | 3'/1,520° | do | 6.5 | Excellent. |

EXAMPLES 4–7

An enameling composition was prepared by mixing 250 parts of frit A and 750 parts of frit B with 40 parts of ball clay, 2.5 parts of bentonite, 3.75 parts of hydrated borax, 2.5 parts magnesium carbonate and 590 parts water, then ball milling this composition until but 0.2% was retained on a 325 Tyler mesh screen.

A binder solution was prepared from 120 parts water, 6.9% of an ammonia-neutralized acrylic resin dispersion in water, the water constituting 75% by weight of such dispersion, 0.6% of an alkylphenoxy polyethoxy ethanol, and 9.1% of sulfonated castor oil. The resin solution is sold under the trademark "Acrysol P6N" by the Rohm & Haas Company; the wetting agent is sold under the

EXAMPLES 8–12

An enameling composition was prepared by mixing 1000 parts of frit C, 7.5 parts of bentonite clay, 0.6 part of gum tragacanth, 15 parts of carrageenin, 10 parts of monobasic potassium phosphate, and 600 parts of water, then ball milling this composition until but 2–4% was retained on a 325 mesh screen. The particulate aluminum metal used was atomized aluminum powder and the type of particulate metallurgical silicon is indicated, the proportions used being per 100 parts of frit in the resulting admixture as tabulated below in Table VI. These additives were blunged into the enameling composition. The resulting admixtures were applied to steel like those of Examples 4–7.

TABLE VI

| | Parts/100 parts of frit | | | | | |
|---|---|---|---|---|---|---|
| Example | Aluminum metal used | Metallurgical silicon used | Firing time/ temp. | Bond to substrate | Reflectance | Cleanability observed |
| 8 | 90 | 30 "silicon metal" | 3'/1,440° | Excellent | 9.5 | Fair to good. |
| 9 | 60 | 60 "silicon metal" | 3'/1,380° | Fair | 10.3 | Excellent. |
| 10 | 60 | 60 standard 50% ferrosilicon, 1.2 retained on 100 mesh screen. | 3'/1,400° | do | 6.8 | Very good. |
| 11 | 30 | 30 "silicon metal" plus 60 parts of iron metal powder. | 3'/1,480° | do | 7.1 | Excellent. |
| 12 | 0 | 120 standard 50% ferrosilicon | 3'/1,520° | do | 6.7 | Good. |

Additionally, further tests were performed using 60 parts of aluminum powder and 60 parts of "silicon metal" per 100 parts of frit fired at top temperatures of 1400°–1520° for three minutes to test for variation in reflectance. The resulting reflectance for 1400° was 7.5, 7.6 for 1440°, 7.7 for 1480°, and 7.7 for 1520° and the color a quite uniform charcoal gray. The cleanability observed in all panels was excellent. The experiment showed the relative insensitivity to color and reflectance change over a wide firing range.

EXAMPLES 13–16

An enameling composition was prepared like that of Examples 8–12, except that, instead of using frit C, a like frit was smelted at 2400–2500° with the proportion of powdered metallurgical silicon per 100 parts of resulting frit indicated in Table VII. This proportion replaced an equal weight proportion of iron oxide in the frit C smelt. Atomized aluminum powder was blunged into the enameling composition in the proportion indicated. The proportion of metallurgical silicon in Table VII is in terms of parts per 100 parts of resulting frit, including such silicon. The resulting admixtures were applied to steel like those of Examples 4–7.

TABLE VII

| Example | Parts per 100 parts of frit | | Firing time/ temp. | Bond to substrate | Reflectance | Cleanability observed |
|---|---|---|---|---|---|---|
| | Atomized aluminum | Percent smelted-in metallurgical silicon used | | | | |
| 13a | 80 | 0.5 "silicon metal" | 3'/1,400° | Excellent | 8.4 | Good. |
| 13b | | | 3'/1,440° | do | 8.5 | Excellent. |
| 13c | | | 3'/1,520° | do | 8.8 | Good. |
| 14 | 80 | 5.1 "silicon metal" | 3'/1,440° | do | 7.9 | Very good. |
| 15 | 80 | 15.9 "silicon metal" | 3'/1,440° | do | 7.5 | Excellent. |
| 16 | 80 | 10.0 of Standard 50% ferrosilicon | 3'/1,400° | do | 8.2 | Very good. |

All of the fired-out coatings exhibited a substantially uniform charcoal-gray color, and when the firing temperature was varied as much as plus or minus 40°, the reflectances observed were within a few tenths of each other.

What is claimed is:

1. A process for forming vesicular material of porous, sorptive surface structure having the property of continuous cleaning which comprises:
   admixing a porcelain enameling composition containing alkali borosilicate frit with about 10–150 parts of particulate elemental aluminum and particulate metallurgical silicon per 100 parts of said frit, there being at least about 0.5 part of said silicon used per 100 parts of said frit, and said aluminum is present in excess of said silicon;
   placing the resulting admixture on a support;
   firing the supported admixture for about 2–5 minutes at a temperature of 1400–1550° F. for obtaining by interaction amongst the components of the admixture said porous sorptive structure; and
   quenching the fired admixture, thereby arresting said interaction.

2. The process of claim 1 wherein said silicon is used in a proportion of about 0.5–60 parts per 100 parts of said frit.

3. The process of claim 1 wherein said silicon is a ferrosilicon.

4. The process of claim 1 wherein said silicon is a nickel-silicon.

5. A process for forming vesicular material of porous sorptive surface structure having the property of continuous cleaning which comprises:
   admixing a porcelain enameling composition containing alkali borosilicate frit with about 20–120 parts of particulate elemental aluminum per 100 parts of said frit, said frit containing as a smelted-in component about 0.5–30 parts of metallurgical silicon per 100 parts of said frit including said silicon, said aluminum is present in excess of said silicon;
   placing the resulting admixture on a support;
   firing the supported admixture for about 2–5 minutes at a temperature of 1400–1550° F. for obtaining by interaction amongst the components of the admixture said porous, sorptive structure; and
   quenching the fired admixture, thereby arresting said interaction.

6. The process of claim 5 wherein said silicon is a ferrosilicon.

7. The process of claim 5 wherein said silicon is a nickel silicon.

References Cited

UNITED STATES PATENTS

| 3,580,733 | 5/1971 | Ott | 117—129 |
| 2,898,236 | 8/1959 | Long et al. | 106—48 X |
| 2,900,276 | 8/1959 | Long et al. | 106—48 X |
| 2,604,410 | 7/1952 | Bryant | 106—48 |
| 2,843,507 | 7/1958 | Long | 117—129 |
| 3,302,000 | 1/1967 | Sherman | 219—393 |
| 3,598,650 | 8/1971 | Lee | 134—2 |
| 1,993,196 | 3/1935 | Turk | 106—48 |
| 3,404,027 | 10/1968 | Kosiorek | 106—48 X |
| 3,523,817 | 8/1970 | Reiss | 117—129 |

WINSTON A. DOUGLAS, Primary Examiner

M. L. BELL, Assistant Examiner

U.S. Cl. X.R.

106—48